US006947399B1

(12) United States Patent
Sen et al.

(10) Patent No.: US 6,947,399 B1
(45) Date of Patent: Sep. 20, 2005

(54) HANDOFF MECHANISMS TO SUPPORT REAL-TIME DELAY-CRITICAL SERVICES IN A NEXT GENERATION NETWORK

(75) Inventors: Sanjoy Sen, Plano, TX (US); Tanuj Bagchi, Plano, TX (US); Kalyan Basu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 602 days.

(21) Appl. No.: 09/617,219

(22) Filed: Jul. 17, 2000

Related U.S. Application Data

(60) Provisional application No. 60/144,597, filed on Jul. 19, 1999.

(51) Int. Cl.$^7$ .................................................. H04Q 7/00
(52) U.S. Cl. ...................... 370/331; 455/436; 455/439; 455/442
(58) Field of Search ................................ 370/331, 348; 455/439, 436, 442, 438

(56) References Cited

U.S. PATENT DOCUMENTS

| | | | | |
|---|---|---|---|---|
| 5,301,356 A | * | 4/1994 | Bodin et al. ................ | 455/33.2 |
| 5,530,912 A | * | 6/1996 | Agrawal et al. ............ | 455/33.2 |
| 5,862,485 A | * | 1/1999 | Linneweh .................... | 455/450 |
| 5,974,036 A | * | 10/1999 | Acharya et al. ............. | 370/331 |
| 6,052,598 A | * | 4/2000 | Rudrapatna et al. ........ | 455/456 |
| 6,108,547 A | * | 8/2000 | Yamashita et al. .......... | 455/442 |
| 6,131,030 A | * | 10/2000 | Schon et al. ................ | 455/438 |
| 6,181,941 B1 | * | 1/2001 | McCarthy .................... | 455/436 |
| 6,205,128 B1 | * | 3/2001 | Le ............................... | 370/331 |
| 6,263,203 B1 | * | 7/2001 | Jahn ............................ | 455/436 |
| 6,424,639 B1 | * | 7/2002 | Lioy et al. ................... | 370/338 |
| 6,438,370 B1 | * | 8/2002 | Einola et al. ................ | 455/422 |
| 6,466,556 B1 | * | 10/2002 | Boudreaux ................... | 370/331 |
| 6,553,015 B1 | * | 4/2003 | Sato ............................ | 370/331 |
| 6,574,475 B1 | * | 6/2003 | Suzuki ........................ | 455/438 |
| 6,628,632 B1 | * | 9/2003 | Dolan .......................... | 370/332 |
| 6,668,170 B2 | * | 12/2003 | Costa et al. ................. | 455/439 |
| 6,732,177 B1 | * | 5/2004 | Roy ............................. | 709/227 |
| 6,829,482 B2 | * | 12/2004 | Rune et al. .................. | 455/442 |
| 2001/0046223 A1 | * | 11/2001 | Malki et al. ................. | 370/338 |

FOREIGN PATENT DOCUMENTS

WO     WO 01/30107     *   4/2001      ............ H04Q/7/38

* cited by examiner

*Primary Examiner*—Ajit Patel
*Assistant Examiner*—Steven Blount
(74) *Attorney, Agent, or Firm*—Haynes and Boone, LLP

(57) ABSTRACT

A next generation wireless data system and method for handoff from a node in a network is presented. The system includes a core network (CN) and a source and a target radio network subsystem (RNS). The interface between the RNSs is enhanced to reduce unnecessary relay of messaging through the CN and thus will reduce traversing delays as well as the resources utilized in message processing. Two separate methods are proposed for handing off the data traffic to the target RNS at the CN packet processing node. These methods are a multi-cast function that concurrently sends data to the source RNS and the target RNS, and a suspend/resume function which suspends the data flow towards the source RNS and resumes the flow towards the target RNS.

29 Claims, 2 Drawing Sheets

HANDOFF MECHANISMS TO SUPPORT REAL-TIME DELAY-CRITICAL SERVICES IN A NEXT GENERATION NETWORK

CROSS REFERENCE

This application claims the benefit of the Provisional application assigned U.S. Ser. No. 60/144,597 filed on Jul. 19 1999. Additionally, this application is related to U.S. Patent Application Ser. No. 09/616,310, filed on even date herewith, entitled HANDOFF FRAMEWORK TO SUPPORT REAL-TIME DELAY-CRITICAL SERVICES IN A NEXT GENERATION NETWORK, assigned to the assignee of the present application, and hereby incorporated by reference herein. Further, this application is related to U.S. patent application Ser. No. 09/469,668, filed on Dec. 22, 1999, entitled GPRS MAC PROCEDURES TO SUPPORT REAL-TIME SERVICES, assigned to the assignee of the present application, and hereby incorporated by reference herein.

BACKGROUND

This application relates generally to a system and method for banding off a mobile node and more particularly to handoff mechanisms to support real-time delay-critical services in next generation wireless networks.

In data networks, such as Internet Protocol (IP) networks, users are typically assigned to a particular class of service (such as Platinum, Gold, or Silver) based on a service level agreement (SLA) with their service provider. In a fixed network, it is relatively easy to engineer and assign the user an appropriate amount of network resources so that the SLA can be maintained at all times. However, mobility and the air-interface being utilized make the problem more difficult because the network resources have to be reassigned and/or renegotiated as the user moves from one cell to another. Additionally, the inherent hostile nature of the air-interface makes it difficult to predict and react accordingly to the changes in the radio frequency (RF).

Historically, there have been two methods to support mobility across wireless cells. In the first method, the mobile is in the full control of the decision making and the target selection process while moving from one cell to the other. In Global Systems for Mobile Communications (GSM) or North American Time Division Multiple Access (NA TDMA) terminology, this process is known as reselection. In a reselection process, the mobile node and the network have a master-slave relationship where the mobile node decides which cell serves its interest best. The network does not really have control over the target cell selection and so it is alerted to the mobile node's decision only after the target cell is selected. As a result, reselection is typically more time consuming from a network resource allocation point of view. Also, reselection during an active session requires the network to temporarily buffer the data destined for the mobile node. Additionally, the target cell may not even have enough resources to address the resource needs of the mobile node.

In the second method, the network, along with input from the mobile node, decides when and where to handoff the mobile node. Handoff refers to the transfer of an ongoing wireless call from one transmission site (cell) to another without disconnecting the call. This method requires constant monitoring of the mobile node's signal strength as well as complex management of target selection and network resource assignment. Network directed handoff also requires more messaging over the air compared to reselection. However, this kind of mobility support can work faster because the target is known before the actual handoff takes place. Also, the resource allocation and appropriate reservation can be done at the target to meet the mobile node's demand. In a variation of this scheme in GSM and NA TDMA, the mobile node assists the network by periodically sending it RF related information regarding the mobile node's neighboring cells. This facilitates the decision making process at the network and is called Mobile Assisted Handoff (MAHO).

The reselection based mobility works fine when the mobile node is idle or in a non-real time active session. However, as previously mentioned, reselection may result in considerable delays. Thus, buffering data for a synchronous real time application (such as voice or video) during this delay interval is not recommended. Because the reselection mechanism does not have any control over the availability of the network resources at the target cell, during the few seconds of reselection related delay, several voice packets may be dropped resulting in audible speech clipping. Additionally, in current data networks, the reselection process does not prioritize resources based on the user's SLA. To address Quality of Service (QoS) requirements for real-time, delay-sensitive multimedia services, the handoff mechanism needs to be optimized and enhanced in next generation wireless data (IP) networks.

Therefore, an improved system and method is desired to reduce or eliminate the aforementioned complexities and limitations.

SUMMARY

In response to these and other complexities and limitations, provided herein is a unique system and method to support a handoff framework for real-time delay-critical services in a next generation wireless data network. The system includes a core network (CN) and a source and a target radio network subsystem (RNS). In one embodiment, the interface between the RNSs is enhanced to reduce unnecessary relay of messaging through the CN and thus will reduce traversing delays as well as the resources utilized in message processing. Two separate methods are proposed for handing off the data traffic to the target RNS at the CN packet processing node. These methods are a multi-cast function that concurrently sends data to the source RNS and the target RNS, and a suspend/resume function which suspends the data flow towards the source RNS and resumes the flow towards the target RNS.

In another embodiment, the source RNS reserves a first radio resource and detects a target RNS. The target RNS reserves a second radio resource, where an amount of the second radio resource is equal to that of the first radio resource. The first RNS then performs the handoff of a mobile node to the target RNS.

Advantages are described in greater detail with respect to the drawings and the remaining disclosure.

DETAILED DESCRIPTION

Figure 1:
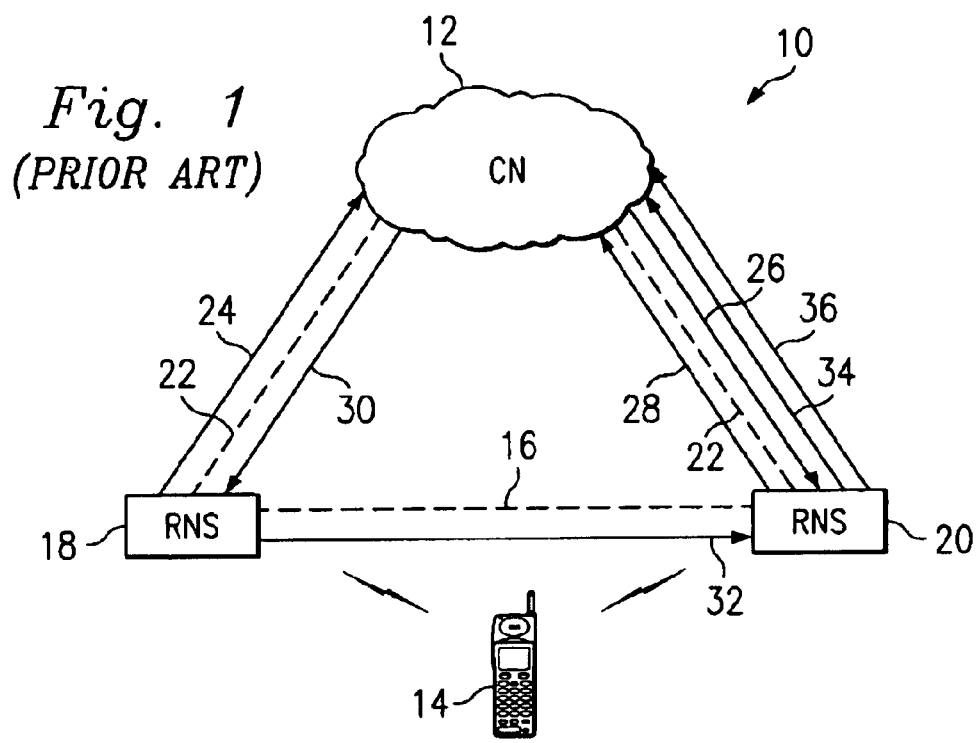
FIG. 1 is a diagrammatic view of a prior art communication system.

FIG. 1 depicts a prior art communication system (network) 10 that includes a Core Network (CN) 12 that is coupled to Radio Network Subsystems (RNSs) 18–20 via interfaces 22. The CN 12 performs several functions including managing a user's profile while the RNSs 18–20 perform radio resource management and handoff control. The RNSs 18–20 include nodes (not shown) that transmit and receive information to and from a mobile node 14. The RNSs 18–20 are also coupled to each other via interface 16 and may pass system related information between one another.

According to FIG. 1, a relocation required message 24 is sent from the RNS 18 to the CN 12 when the mobile node 14 needs to perform a handoff. The CN 12 then sends a relocation request message 26 to the RNS 20. In response, the RNS 20 sends a relocation request acknowledge message 28 to the CN 12 which sends a relocation command message 30 to the RNS 18. The RNS 18 then sends a relocation commit message 32 to the RNS 20 which indicates to the CN that the handoff has occurred, via a relocation detect message 34 and relocation complete message 36. Limitations of the system 10 are that it is centralized and controlled mainly by packet processing functions in the CN 12.

Figure 2:
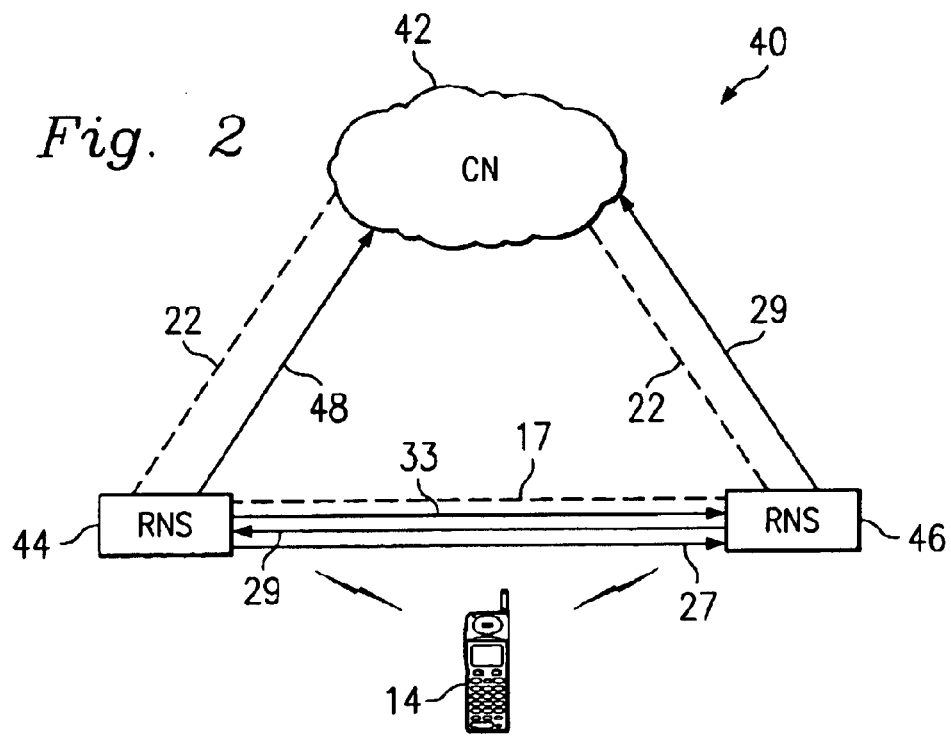
FIG. 2 is a diagrammatic view of a communication system of the present invention for handing off a mobile node using multi-cast functionality.

FIG. 2 depicts a communication system 40 of the present invention that includes a CN 42 and RNSs 44–46 for performing handoff using the multicasting of messages. During the handoff process, it is important to maintain the user's QoS. As such, according to the present disclosure, the following are identified as requirements during handoff in a next generation network (such as communication system 40, a 3G.IP network, a 3G.PP network, and/or a 4G network):

1. Minimizing the handoff delay for real-time, non-elastic applications (such as voice and video);

2. Initiating handoffs at the right time to effectively manage RF related issues;

3. Prioritizing handoffs based on the user's SLA and application being used; and 4. Maintaining the SLA across the handoff boundary.

Delay Minimization

A primary objective for efficient hand-off for real-time services is the reduction of delay. This can be achieved in the following ways:

- a prior resource reservation for hand-off;
- minimization of the number of messages that need to be exchanged to complete the hand-off process; and
- closely coupling the source RNS (such as RNS 44) relocation process with the movement of the user equipment (UE) such as the mobile node 14, a laptop computer or any other device that can transmit and receive data to optimize the payload traffic route through the network. It should be noted that source RNS relocation and hand-off are two separate processes.

The entire hand-off mechanism can be divided into three broad sub-functions:

1) Hand-off decision (which is not within the scope of this invention)

2) Resource reservation (for both radio and wireline)

3) Path switching. This will involve switching between nodes within the same RNS, as well as that between different RNSs.

The resource reservation and path switching functions will be discussed further.

Resource Reservation

A new Media Access Controller (MAC) state machine for wireless data systems is proposed where a new "Packet Stand-by" state has been added to support real-time, delay-sensitive services. In such a scenario, the UE 14 clings to some (such as a reduced amount of) radio resource in the "Packet Stand-by" state, despite the fact that the application does not have any data to transmit. This is required to facilitate the rapid initiation of data transmission (without going through the MAC contention mechanism to acquire a new channel) as soon as the application is ready to send data.

In the case of handoff real-time services, resource reservation is initiated as soon as the target node such as RNS 46 is detected by a handoff decision function. The amount of radio resource reservation is dictated by the MAC state of the UE 14 during handoff. A handoff controller interacts with a Radio Resource Manager (RRM) to reserve the same amount of resource in the target node that the UE 14 was using in the current node (the handoff controller and the RRM are not shown but are contained in each of the RNSs 44–46). Thus the UE 14 does not have to go through the resource contention phase even though it does not have data to send.

Additionally, the resource "wastage" in the target node is minimized because resource allocation is based on the MAC state machine of the UE 14, and is not fixed. A "soft" reservation mechanism is also used such that the reserved resource can be used by other low priority, non-real-time services until the user requests data to be transmitted. In that event, the lower priority traffic is pre-empted and the resource is allocated to the user. If the RRM in the target node is not able to admit the handoff due to resource constraints, then the QoS can be renegotiated through explicit messaging or via an implicit policy decision (embedded in the user's SLA). For example, a user subscribing to "bronze" service can be either degraded or dropped, while a "gold" service subscriber may only be degraded, but never dropped.

Path Switching

When the mobile moves between nodes (or cell sites) within the same RNS, and assuming each node is connected to a Radio Network Controller (not shown) in a tree-like fashion, the path switching is trivial and controlled by the handoff controller. In case of inter RNS hand-off, two cases might arise:

1) the mobile node 14 is always anchored at a serving RNS, and depends on RNS-RNS forwarding to receive or transmit data. This handoff scenario is not associated with source RNS relocation; and 2) the mobile node 14 performs handoff with SRNS relocation.

The handoff scenario that is not associated with the source RNS relocation is unsuitable for real-time traffic because the path delay may increase proportionately with the forwarding (or tunneling) paths. This type of forwarding chain is generally not very scalable in IP networks due to the additional overhead of maintaining tunnel state information. Also, the current mechanism of performing source RNS relocation, which was described in FIG. 1, is unsuitable for real-time services. The source RNS relocation should be closely coupled with the actual hard handoff process and occur with minimal delay to reduce the "mute period" of real-time, delay-sensitive services during handoff. Thus it also makes sense to couple the source RNS relocation process with the resource reservation function (discussed earlier) for the sake of efficiency and reduction of delay.

The present invention enhances the interface 16 between the RNSs 18–20 in FIG.1 to perform some of the messages that is transmitted and received via the interface 22. This enhancement will reduce the unnecessary relay of the messaging through the CN 12 and thus will reduce the resources utilized in message processing and traversing delays. Two separate methods are proposed for handing off the data or bearer) traffic to the target RNS (such as RNS 46) at the CN 42 packet processing node. These methods are a multi-cast function to the source RNS and the target RNS, which is described further in FIG. 2, and a suspend/resume function (suspending the flow towards the source RNS and resuming the flow towards the target RNS) at the CN 42, which is described further in FIG. 3.

Referring again to FIG. 2, in operation, the source RNS 44 decides on a target RNS 46 (this target RNS selection is closely coupled with the handoff threshold detection) and sends a Relocation Request message 27 to the target RNS 46 via the enhanced interface 17. The Relocation Request message 27 is enhanced to contain details of the radio access bearer identifier, resource reservation information (as discussed above), an IP address of the packet processing node serving the UE 14 in the CN 42, as well as any uplink tunnel state information. The source RNS 44 sends a Relocation Started message 48 to the packet processing node serving the UE 14 in the CN 42. Upon receiving the Relocation Started message 48, the CN 42 waits for a Relocation request ACK message to be received from the target RNS 46. The target RNS 46 reserves the radio resources and bi-casts the Relocation request ACK message 29 the packet processing node in the CN 42 and to the source RNS 44. This message 29 will contain the IP address if the packet processing function allocated to the UE 14 within the target RNS 46 and sets up the tunnel to the CN 42 for the uplink packets. The CN 42 sets up the tunnel for downlink packets (which is a duplicate copy of the tunnel towards the source RNS 44) towards the target RNS 46. The CN 42 then begins to bi-cast the downlink packets towards the source RNS 44 and the target RNS 46. These packets are buffered by the target RNS 46. In the meantime, the source RNS 44 handoff controller (not shown) completes the handoff process to the target cell (not shown) which is within the target RNS 46. The source RNS 44 transmits to the target RNS a Relocation Commit message 33 that contains information regarding the last packet that has been sent to the UE 14. The target RNS 46 starts then starts transmitting to the UE 14 from the next packet onward in its buffer.

In order to achieve a smooth handoff, the CN 42 (especially if it is non-QoS guaranteed) and a network between the RNS's 44–46 (such as a public IP network with no guarantee on delay) should be well-engineered to ensure that the above messages described in FIG. 2 do not take a long time to reach their destinations thus prolonging the mute period during handoff. If this engineering is not possible, a mute buffer can be used at the target RNS 46, with a mute period estimated from network delay behavior. If the mute buffer solution is utilized, the Relocation Commit message 33 may not need to contain the information regarding the last packet that was sent to the UE 14.

Figure 3:
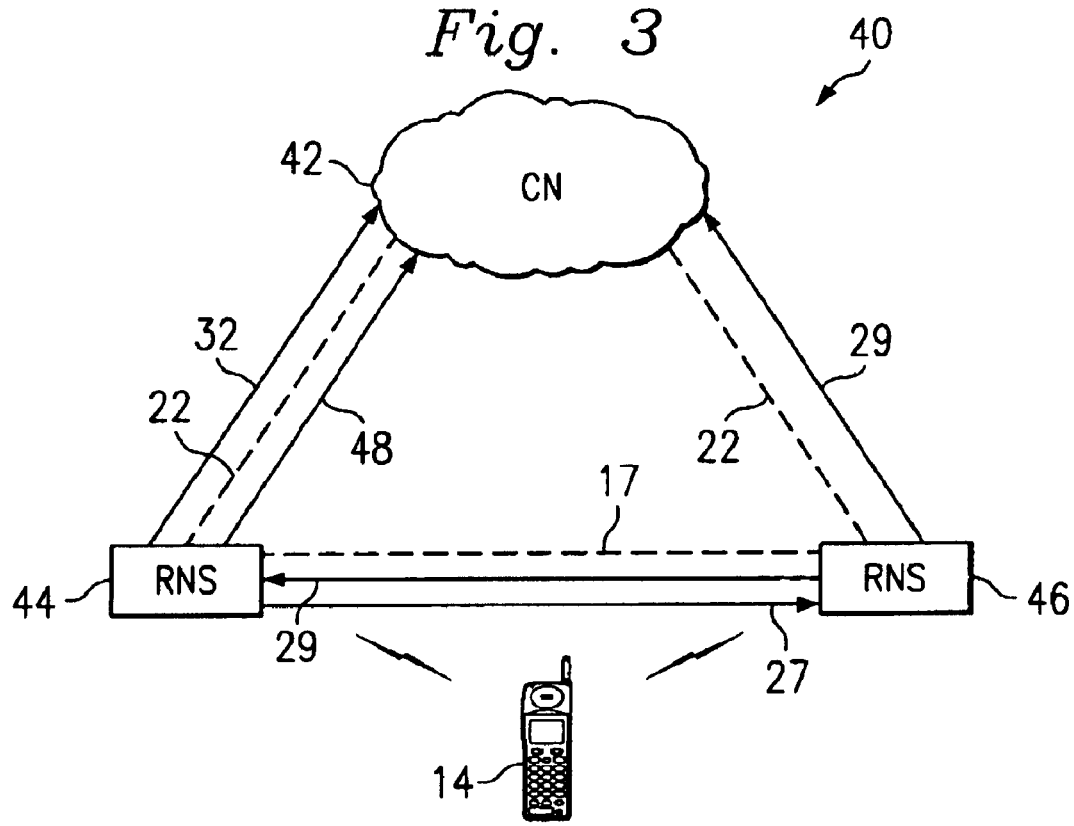
FIG. 3 is a diagrammatic view of a communication system of the present invention for handing off a mobile node using suspend/resume functionality.

FIG. 3 describes the suspend/resume function at the CN 42. Similar to the steps described in FIG. 2, in operation, the source RNS 44 decides on the target RNS 46 and sends a Relocation Request message 27 to the target RNS 46 via the enhanced interface 17. The Relocation Request message 27 is enhanced to contain details of the radio access bearer identifier, resource reservation information (as discussed above), an IP address of the packet processing node serving the UE 14 in the CN 42, as well as any uplink tunnel state information. The source RNS 44 sends a Relocation Started message 48 to the packet processing node serving the UE 14 in the CN 42. Upon receiving the Relocation Started message 48, the CN 42 waits for the Relocation request ACK message to be received from the target RNS 46. The target RNS 46 reserves the radio resource and bi-cast the Relocation request ACK message 29 to the packet processing node in the CN 42 and to the source RNS 44. This message 29 will contain the IP address of the packet processing function allocated to the UE 14 within the target RNS 46 and sets up the tunnel to the CN 42 for the uplink packets. The CN 42 sets up the tunnel for downlink packets towards the target RNS 46. The CN 42 then begins to bi-cast the downlink packets towards the source RNS 44 and the target RNS 46. These packets are buffered by the target RNS 46. In the meantime, the source RNS 44 handoff controller (not shown) completes the handoff process to the target cell (not shown) which is within the target RNS 46. The source RNS 44 transmits to the CN 42 the Relocation Commit message 33 that contains information regarding the last packet that has been sent to the UE 14. The CN 42 suspend traffic flow towards the source RNS 44 and resumes transmission towards the target RNS 46.

In this scenario, if the network engineering to ensure that the above messages described in FIG. 3 do not take a long time to reach their destinations is not possible, no mute buffer would be required at the target RNS 46.

Figure 4:
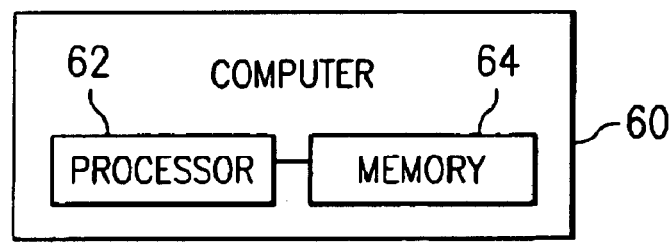
FIG. 4 is a computer of the present invention.

FIG. 4 depicts a computer 60 that comprises a processor 62 and memory 64. The computer 60, which contains a computer program, may be a personal computer or laptop, the CN 42, the RNSs 44–46, the UE 14, and/or any device that can transmit and receive handoff related information. The processor 62 may be a central processing unit, digital signal processor, microprocessor, microcontroller, microcomputer, and/or any device that manipulates digital information based on programming instructions. The memory 64 may be read-only memory, random access memory, flash memory and/or any device that stores digital information. The memory 64 is coupled to the processor 62 and stores programming instructions (contained in the computer program) that, when read by the processor 62, cause the processor to perform the functionality discussed above with reference to FIG.'s 2 and 3.

The present invention thus enjoys several advantages. For example, two methods are proposed for handing off data traffic to a target RNS. These methods, the multi-cast function and the suspend/resume function, achieve two fundamental purposes: closely coupling the hand-off process (with resource reservation) with the source RNS relocation process to reduce hard handoff latency for real-time services, and making the source RNS relocation more efficient by reducing the amount of messaging and the involvement of the CN.

It is further understood that other modifications, changes and substitutions are intended in the foregoing disclosure and in some instances some features of the disclosure will be employed without corresponding use of other features. Additionally, singular discussion of items and/or computers located in the system 40 is also meant to apply to situations where multiple items and/or computers exist. Further, the system 40 may include additional and/or fewer items and/or computers that perform similar functions discussed in the disclosure. Accordingly, it is appropriate that the appended claims be construed broadly and in a manner consistent with the scope of the disclosure.

What is claimed is:

1. A method for handoff from a first node in wireless network, the method comprising:

reserving a first radio resource for the first node in the wireless network;

detecting a target node, wherein the first node is coupled to the target node;

reserving a second radio resource for the target node, wherein an amount of the second radio resource is equal to that of the first radio resource;

sending a relocation request message from the first node to the node;

bi-casting an acknowledge message from the target node to the first node and a core network; and performing the handoff.

2. The method of claim 1 further comprising determining the first radio resource by a controlling system in the wireless network, wherein the controlling system is coupled to the first node and the target node.

3. The method of claim 1 wherein the second radio resource may be used for low priority traffic prior to perform the handoff.

4. The method of claim 1 further comprising negotiating a change in service for the handoff if the target node is not able to perform the handoff.

5. The method of claim 4 wherein the negotiation is dependent on a class of service.

6. A method for performing handoff from an originating Radio Network Subsystem (RNS) in a wireless network, the method comprising:

determining a target RNS, wherein the target RNS is coupled to the originating RNS;

sending a relocation started message from the originating RNS to a Core Network (CN), wherein the CN is coupled to the originating RNS and the target RNS;

receiving, at the CN, the relocation started message;

reserving, by the target RNS, radio resources;

bi-casting, from the target RNS to the originating RNS and the CN, an acknowledge message; and completing the handoff to the target RNS.

7. The method of claim 6, wherein the relocation request message comprises information pertaining to a radio resource bearer identifier.

8. The method of claim 6, wherein the relocation request message comprises information pertaining to resource reservation.

9. The method of claim 6, wherein the relocation request message comprises information pertaining to an Internet Protocol (IP) address.

10. The method of claim 6, wherein the relocation request message comprises information pertaining to an uplink tunnel state.

11. The method of claim 6 wherein the acknowledge message contains an IP address of a packet processing function in the target RNS.

12. The method of claim 6 wherein the acknowledge message prepares a tunnel to the CN for uplink packets.

13. The method of claim 6 further comprising preparing, by the CN, the tunnel for downlink packets prior to completing the handoff to the target RNS.

14. The method of claim 13 further comprising sending, by the CN, the downlink packets to the originating RNS and the target RNS.

15. The method of claim 14 comprising buffering, by the target RNS, the downlink packets.

16. The method of claim 6 further comprising sending, by the originating RNS, a relocation commit message that comprises information relating to a last downlink packet that was sent after completing the handoff to the target RNS.

17. The method of claim 16, wherein the relocation commit messages are sent to the target RNS.

18. The method of claim 17 further comprising transmitting, by the target RNS, a next downlink packet in its buffer.

19. The method of claim 16, wherein the relocation commit message is sent to the CN.

20. The method of claim 19 further comprising suspending, by the CN, the downlink packet transmission to the originating RNS.

21. The method of claim 20 comprising sending, by the CN, the downlink packets to the target RNS.

22. A system for performing handoff from an originating Radio Network Subsystem (RNS) in a wireless network, the system comprises:

means for determining, by the originating RNS, a target RNS, wherein the target RNS is coupled to the originating RNS;

means for sending, by the originating RNS, a relocation started message to a Core Network (CN), wherein the CN is coupled to the originating RNS and the target RNS;

means for receiving, at the CN, the relocation started message;

means for reserving, by the target RNS, radio resources;

means for bi-casting, from the target RNS to the originating RNS and the CN, an acknowledge message;

means for preparing, by the acknowledge message, a tunnel to the CN for uplink packets;

means for preparing, by the CN, a tunnel for downlink packets prior to completing the handoff to the target RNS;

means for bi-casting, by the CN, the downlink packets to the originating RNS and the target RNS; and means for completing the handoff to the target RNS.

23. The system of claim 22 further comprises means for sending a relocation request message to the target RNS prior to the relocation started message being sent.

24. The system of claim 22 further comprises means for buffering, by the target RNS, the downlink packets.

25. A system for performing handoff from an originating Radio Network Subsystem (RNS) in a wireless network, the system comprises:

means for determining, by the originating RNS, a target RNS, wherein the target RNS is coupled to the originating RNS;

means for sending, by the originating RNS, a relocation started message to a Core Network (CN), wherein the CN is coupled to the originating RNS and the target RNS;

means for receiving, at the CN, the relocation started message;

means for reserving, by the target RNS, radio resources;

means for sending from the target RNS, an acknowledge message;

means for preparing, by the acknowledge message, a tunnel to the CN for uplink packets;

means for preparing, by the CN, a tunnel for downlink packets prior to completing the handoff to the target RNS;

means for sending, by the CN, the downlink packets to the originating RNS and the target RNS;

means for completing the handoff to the target RNS; and means for receiving, by the originating RNS and the CN, the acknowledge message.

26. A method for performing a handoff of a mobile device from a source radio network subsystem (RNS) to a target RNS in a wireless network, the method comprising:

sending a relocation request message from the source RNS to the target RNS, wherein the relocation request message includes radio access bearer identifier information, resource reservation information, and an internet protocol (IP) address of a core network (CN) packet processing node serving the mobile device;

sending a relocation started message from the source RNS to the packet processing node;

reserving, by the target RSN, radio resources identified in the relocation request message;

bi-casting a relocation acknowledgement message from the target RNS to the packet processing node and the source RNS, wherein the relocation acknowledgement message includes an IP address of a packet processing function within the target RNS;

bi-casting downlink packets from the packet processing node to the source RNS and the packet processing function within the target RNS;

buffering the downlink packets at the target RNS;

sending a relocation commit message from the source RNS to the target RNS identifying a last packet sent from the source RNS to the packet processing node; and sending packets from the target RNS to the mobile device beginning with a first packet, wherein the first packet is a buffered packet that immediately follows the last packet identified in the relocation commit message.

27. The method of claim 26 wherein the relocation request message includes tunnel information, and wherein the method further comprises setting up a tunnel for uplink packets from the target RNS to the packet processing node, and setting up a tunnel for downlink packets from the packet processing node to the target RNS.

28. The method of claim 26 further comprising determining, by the source RNS, the target RNS.

29. The method of claim 26 further comprising, upon receiving the relocation started message, waiting by the packet processing node for a relocation request acknowledgement message from the target RNS.

* * * * *

UNITED STATES PATENT AND TRADEMARK OFFICE
CERTIFICATE OF CORRECTION

PATENT NO. : 6,947,399 B1
APPLICATION NO. : 09/617219
DATED : September 20, 2005
INVENTOR(S) : Sanjoy Sen, Tanuj Bagchi and Kalyan Basu It is certified that error appears in the above-identified patent and that said Letters Patent is hereby corrected as shown below:

Column 1, line 24, the word "banding" should read --handling--.

Column 6, Claim 1, line 59, the word --a-- should be inserted between the words "in" and "wireless".

Column 7, line 2, the word --target-- should be inserted between the words "the" and "node".

Signed and Sealed this

Twenty-third Day of January, 2007

JON W. DUDAS
*Director of the United States Patent and Trademark Office*